Sept. 4, 1956   J. R. HAYWARD ET AL   2,761,195
APPARATUS FOR MAKING CONDENSERS
Filed Oct. 4, 1949   4 Sheets-Sheet 4
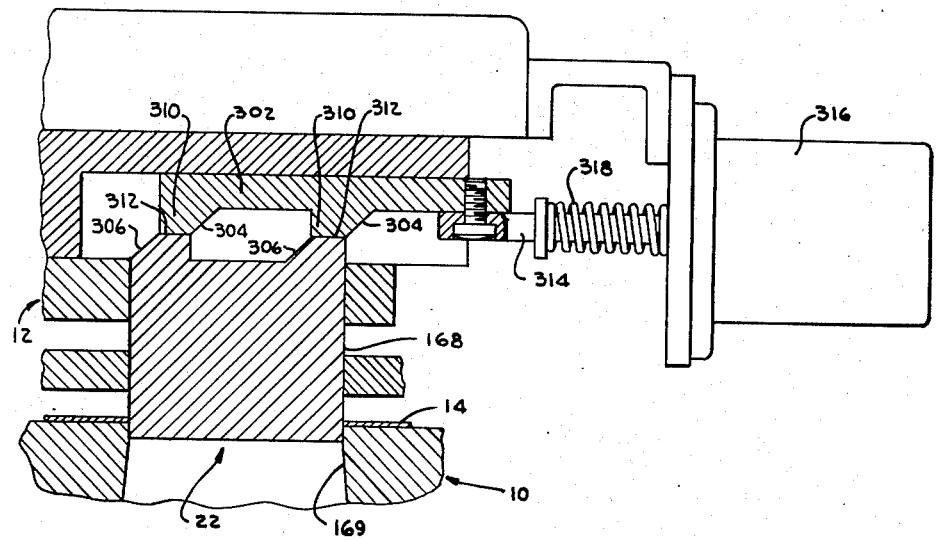
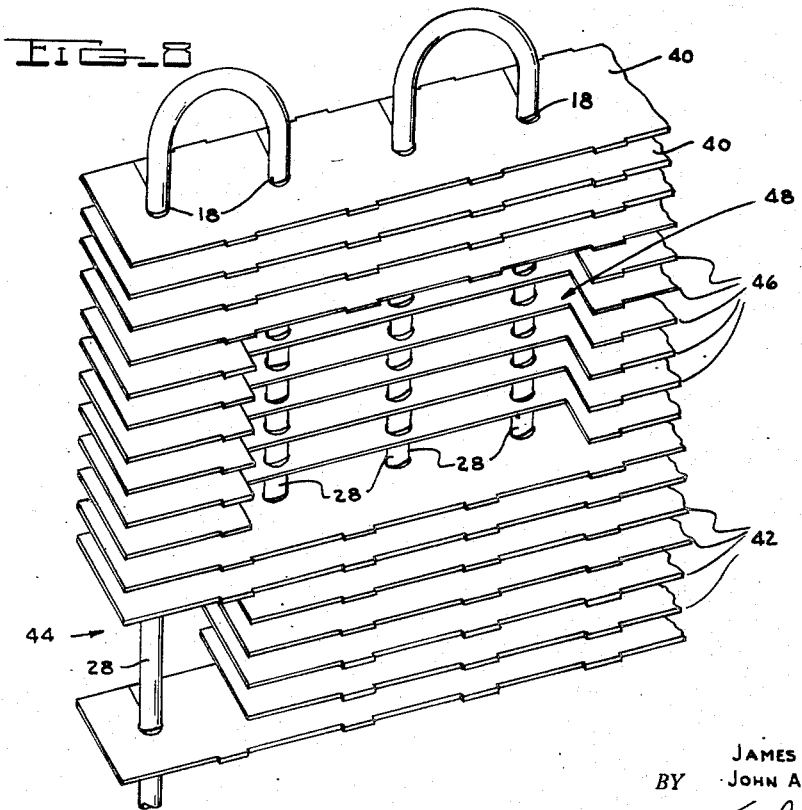
INVENTORS
JAMES R. HAYWARD
BY JOHN A. SCHILD
ATTORNEY

United States Patent Office 2,761,195
Patented Sept. 4, 1956

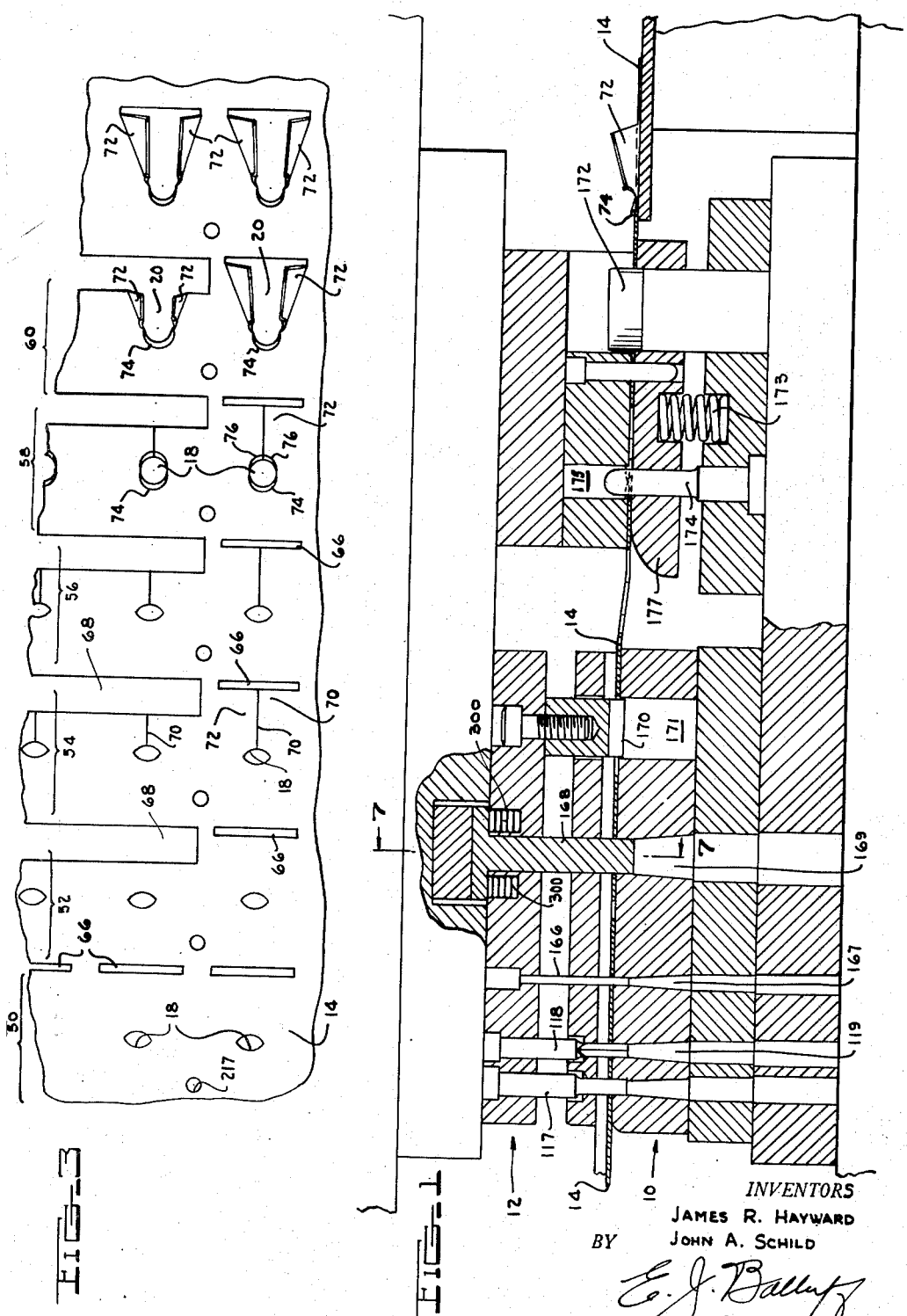

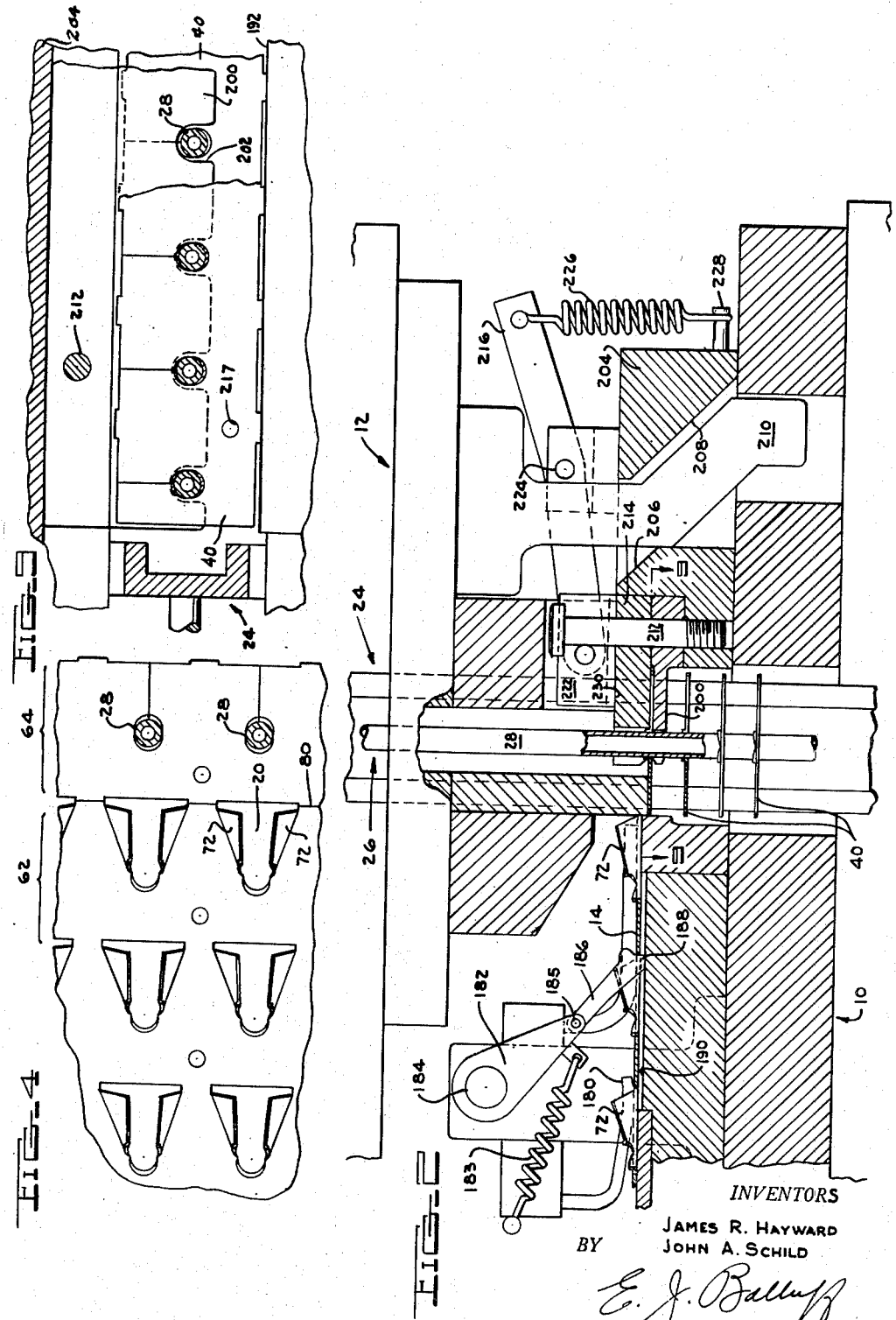

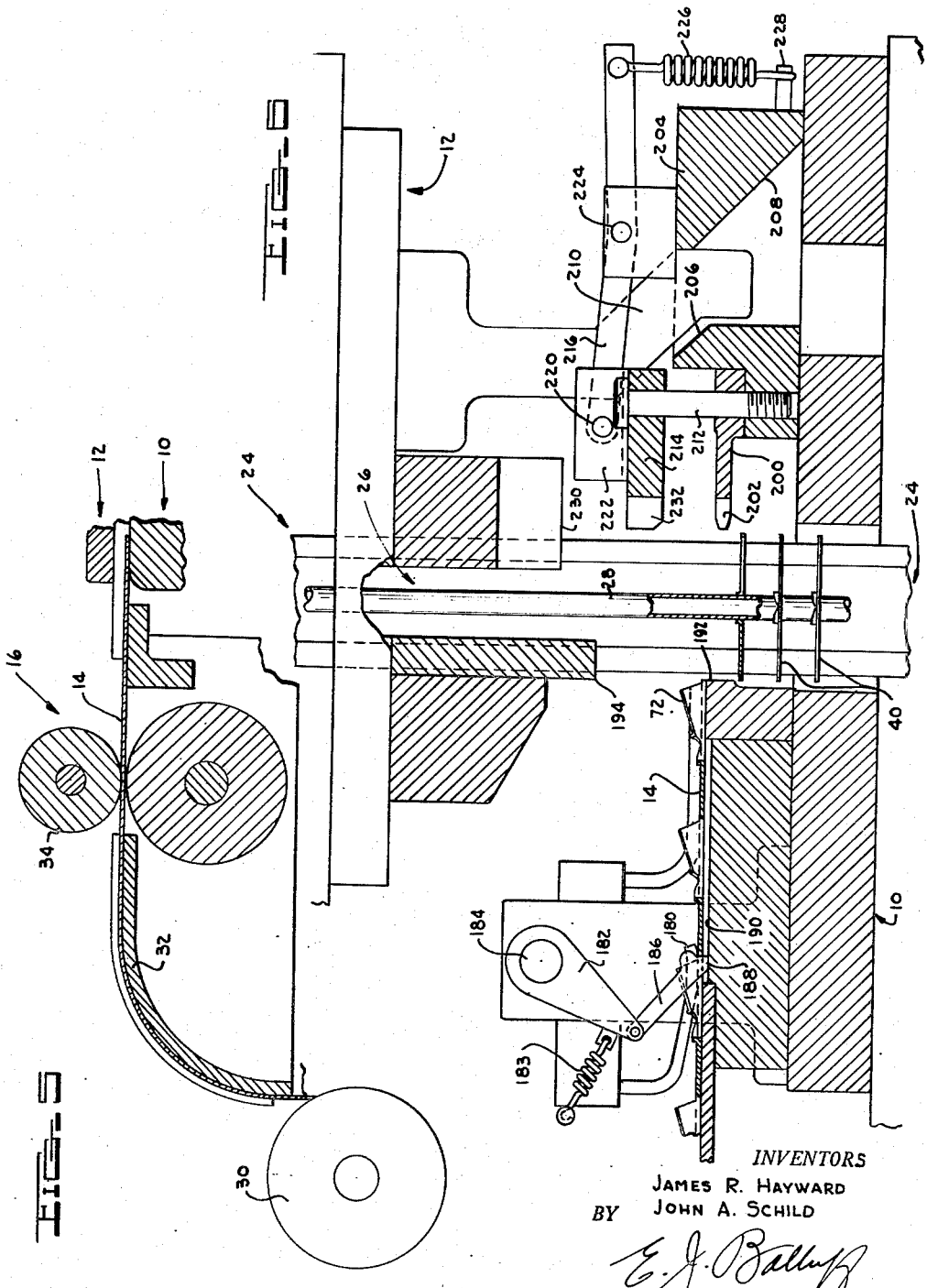

2,761,195
APPARATUS FOR MAKING CONDENSERS

James R. Hayward and John A. Schild, Washington, Ind., assignors to McCord Corporation, Detroit, Mich., a corporation of Maine Application October 4, 1949, Serial No. 119,454

4 Claims. (Cl. 29—33)

This invention relates to apparatus for making fins and assembling such fins on tubing, and has particular reference to heat exchangers such as condensers.

A principal object of the invention is to provide a new and improved apparatus for making fins and assembling such fins on tubing.

Another object of the invention is to provide a new and improved method of making fins and assembling and securing such fins on tubing to form a heat exchanger.

Other and further objects of the invention will be apparent from the following description and claims and may be understood by reference to the accompanying drawings, of which there are four sheets, which by way of illustration show a preferred embodiment of the invention and what we now consider to be the best mode in which we have contemplated applying the principles of our invention. Other embodiments of the invention may be used without departing from the scope of the present invention as set forth in the appended claims.

In the drawings:

Fig. 1 is a fragmentary vertical sectional view of the die sections for forming the fins shown in their closed position;

Fig. 2 is a fragmentary vertical sectional view of another portion of the die sections and the tubing holding means with the die sections shown in their closed position;

Fig. 3 is a fragmentary plan view of the fin stock illustrating certain of the steps in the manufacture of the fins;

Fig. 4 is a fragmentary plan view of the fin stock showing the final steps in the manufacture of the fins and the assembly thereof on the tubing;

Fig. 5 is a fragmentary sectional view of the apparatus illustrating the stock reel and the means for feeding the fin stock to the apparatus which is illustrated in Fig. 1;

Fig. 6 is a view similar to Fig. 2 but showing the dies in the open position thereof;

Fig. 7 is a fragmentary sectional view taken along the line 7—7 of Fig. 1 and illustrating the notching punch;

Fig. 8 is a fragmentary sectional view of a finned tube condenser which has been made and assembled on the apparatus; and Fig. 9 is a fragmentary sectional view taken along the line 9—9 of Fig. 2, looking in the direction of the arrows.

Figs. 3 and 4 of the drawings illustrate the various operations performed on the fin stock in its progress through the apparatus shown in Figs. 1 and 2, and the operations indicated on the fin stock in Figs. 3 and 4 are set directly above the respective parts of the apparatus shown in Figs. 1 and 2 for performing such operations.

The apparatus for making the fins and assembling the fins on the tubing comprises in general cooperating die sections 10 and 12 arranged for receiving a sheet 14 of fin stock therebetween, feeding means 16 (Fig. 5) for advancing the sheet of fin stock relative to the die sections, the die sections comprising die means operable for punching a series of tubing holes 18 and for deflecting the fin stock between the tubing holes and one edge of the fin so as to form a tube entering slot 20 for each of the holes, die means 22 (Fig. 7) operable for notching the fin stock along an edge of a fin, means comprising a carriage or frame 24 (Fig. 2) for positioning a bank of tubing 26 in the path of movement of the fin stock with the tubing runs 28 disposed normal to the plane of the fin stock and with a tubing run in line with each of said tube entering slots, and means operable for bending the deflected portion of the fin stock back into the plane of the fin stock after the tubing has been projected through the tube entering slots into the tubing holes.

The apparatus illustrated forms part of a reciprocating press, such as a Henry & Wright press, the lower die section 10 being mounted on the bed of the press and the upper die section 12 being mounted on the reciprocal head of the press. Such a press is power driven and is adapted to move the die section 12 into cooperative relation with the die section 10 upon each stroke of the press, and then to retract the die section 12 in order that the stock 14 may be advanced.

The stock 14 used for making fins for heat exchangers usually is relatively light gauge steel which may be purchased in a coil and is mounted on a reel 30. From the reel the stock is uncoiled and fed over an apron 32 to the feeding means 16, which may comprise feeding rolls 34 and 36 between which the stock 14 passes. The rolls 34 are suitably driven so that when the press is open the stock 14 will be advanced a distance which is equal to the width of a fin, and the feeding of the stock is intermittent in order to permit the die sections to close and perform the various operations thereon required to form the fin.

Fig. 8 shows a part of a condenser of the kind which the apparatus herein disclosed is adapted to make, and such condenser comprises a bank of tubing having parallel runs 28 and a series of fins 40, the fins being arranged transversely of the runs and in spaced and parallel relation with reference to each other. The bank of tubing may comprise a single length of tubing bent into serpentine form, and each fin 40 is provided with a series of tubing holes 18, one for each of the tubing runs 28. The tubing may be a solder-coated metal tube and the fins made of metal stock and secured one by one on the bank of tubing. After the assembly of the fins on the tubing to form a condenser of the desired size, the condenser may be subjected to the heat of a baking oven or brazing furnace so as to cause the solder coating on the tubing to melt and form an integral joint between the tubing and each of the fins. As herein used, the term solder coating includes any kind of coating on the tubing which when subjected to heat will melt and form an integral metallic joint between the tubing and the fins.

For some applications it is necessary that the fins of the condenser be notched out at the ends or on one of the faces, and in Fig. 8 the condenser is illustrated with two of such notched-out portions. In one instance the length of four fins 42 has been reduced so as to leave a notch 44 at one edge of the condenser. This notch might be used for a mounting bracket or for some other purpose.

In another instance six fins 46 of the condenser along one face thereof have been notched out so as to leave the notch 48. Depending upon the particular requirements of the refrigerator manufacturers, such notches 44 and 48 may be of different sizes and variously located in the condenser.

According to the apparatus for and method of making condensers herein disclosed, it is possible to produce variations in a predetermined number of fins by either reducing the length thereof or notching out a portion along a side thereof, or both, without any extra handling of the fin stock and without interfering with the operation of the machine and without requiring the stopping of the machine.

According to the process herein contemplated, the fin stock 14 is intermittently advanced to a series of stations 50, 52, 54, 56, 58, 60, 62 and 64 by the feeding means 16. At station 50 a series of tubing holes 18 is formed transversely of the stock. In adddition there is also formed at this station a series of transversely extending slots 66 arranged transversely of the stock and in spaced relation with the holes 18. After the stock is advanced to station 52 the notch 68 is formed. The notch 68 may be formed in one or more or all of the fins, depending upon the length of notch 48 which it is desired to leave in the face of the condenser.

At station 54 slits 70 are formed in the stock between the slots 66 and the tubing holes 18, each of the slits severing the fin stock between a slot 66 and a hole 18 so as to form wings 72 between the series of holes 18 and slots 66. It will be observed that in some cases the formation of the notch 68 has eliminated some of the slots 66. Station 56 is an extra station at which no operation is performed on the stock. At station 58 the fin stock around the tubing holes is deflected to form laterally extending flanges 74 and 76, the flanges 74 forming tubing seats.

At station 60 the wings 72 are deflected out of the plane of the fin stock to form the tube entering slots 20 through which a run of tubing may be positioned in each of the tubing holes and on a tubing seat 74. At station 64 a bank of solder-coated tubing is positioned in the path of movement of the fin stock with the tubing runs disposed normal to the plane of the fin stock and with a tubing run 28 in line with each of said tube entering slots 20. At station 62 the fin stock is severed along line 80 between the side edges thereof and in line with the transversely extending slots so as to define one edge of a fin. In fact, this severing of the fin stock along the line 80 severs the preceding fin from the stock and at the same time exposes the tube entering slots 20 so that the fins may be projected on to the tubing.

At station 64 the tubing runs 28 are projected through the tube entering slots 20 into the tubing holes 18, and the wings 72 are bent back into the plane of the fin stock so as to close the tube entering slots. Thereafter the fin, which is secured to the tube, is cut from the fin stock along the line 80, and the bank of tubing 26 with the fin secured thereon is indexed so as to properly position the tubing runs 28 for the next fin.

All of such fin making operations are performed successively on one portion of the stock to form a fin and contemporaneously on different portions of the stock to partially form a series of fins at the same time, and such operations are repeated until the bank of tubing 26 has the desired number of fins secured thereon. Thereafter the bank of tubing with the fins secured thereon is subjected to heat in order to melt the solder and effect an integral joint between the fins and each of the tubing runs.

As previously indicated, the apparatus for making the fins and assembling such fins one by one or a bank of tubing includes the feeding means 16 which advances the fin stock 14 to the die sections 10 and 12, the die section 10 being stationary and mounted on the bed of the press, and the die section 12 being mounted on the movable head of the press above the section 10 and operable during the closing and opening of the press to perform the various operations just described.

The movable die section 12 is provided with a series of punches 118 and the section 10 is provided with a series of holes 119 which cooperate upon the closing of the press to form the series of holes 18. A punch 117 may be provided so as to form locating holes 217 in the fin stock. The upper die 12 is provided with a series of punches 166, and the lower die 10 is provided with a series of holes 167 which cooperate upon the closing of the die sections to form the slots 66.

The notch 68 is formed by a punch 168 which is carried by the upper die 12 and a hole 169 is formed in the lower die 10. The slits 70 are formed by a cutting edge 170 carried by the uper die 12 and a recess 171 in the lower die 10. The flanges 74 and 76 around the tube holes 18 are formed by a series of upstanding pins 174 carried by the lower die 10 and cooperating holes 175 formed in the upper die 12. A floating shoe or die 177 is carried by the lower die 10 and is biased upwardly by a series of springs 173. The pins 174 project through holes in the floating die 177. When the press opens, the springs 173 push the floating die 177 upwardly so that the fin stock 14 will be clear of the upper ends of the pins 174.

The lower die 10 also carries a series of upstanding punches 172 which are engageable with the wings 72 to deflect the same upwardly out of the plane of the fin stock so as to form the tube entering slots 20. The punches 172 extend upwardly through holes in the floating die 177 so as to upwardly deflect the wings 72 when the press is closed, and so that when the press opens the die 177 will push the fin stock clear of the punches 172.

Referring now to Fig. 2, which is a continuation of Fig. 1, the stock is advanced upon the upper surface of the die 10, fingers 180 being employed to hold the stock against the upper surface of the die 10 in order to prevent buckling of the stock. A reciprocating feeding means is employed just ahead of the bank of tubing 26 to tauten the stock, and this reciprocating feeding means comprises an arm 182 secured on an oscillating shaft 184 which is arranged to be oscillated synchronously with the opening and closing of the die sections 10 and 12. The arm 182 has a return spring 183 connected thereto. A pusher 186 is pivoted at 185 to the end of arm 182. The lower end 188 of pusher 186 reciprocates in slot 190 in the upper surface of the die 10 and is engageable with the forward edge of the slot 66 so as to tension the stock 14 and push the same forward. When the die 12 moves to its open position, spring 183 will retract the pusher 186 so that the lower end 188 thereof will engage in the succeeding slot 66. The pusher 186 passes through the tube entering slots 20. Preferably one pusher 186 is arranged for each of the slots 66 so that the stock will be uniformly tensioned from one side to the other thereof.

At station 64 the bank of tubing 26 is secured in position by a means which comprises the carriage or frame 24. The carriage or frame 24 simply forms a holder for the tubing while the fins are assembled thereon, and suitable means (not shown) are associated with the frame 24 for indexing the same so as to bring successive portions of the bank of tubing into position to receive the fins thereon in properly spaced relation. The frame 24 is vertically slidable on the press, and after each stroke of the press is indexed downwardly.

The upper die section 12 and the lower die section 10 are provided with cutting edges 192 and 194 (Fig. 6) which cooperate upon the closing of the press to sever the fin stock along the line 80. Each fin is projected upon the runs of the tubing bank 26 before it is severed from the fin stock.

With the press open, as shown in Fig. 6, the bank of tubing 26 has been indexed so that it is ready to receive another fin. Before the press closes, the fin stock is advanced so as to cause the pair of wings 72 defining a tube entering slot to straddle a tubing run 28 and to seat such tube run against the tubing seat 74. Thereafter means are provided for closing the wings 72 in order to secure the fin on the bank of tubing, and such means comprise a shuttle die 200 having a series of notches 202 for accommodating the tubing runs 28 when the parts are arranged as shown in Fig. 2. The shuttle die is reciprocable between the positions in which it is shown in Figs. 2 and 6 and, when positioned as shown in Fig. 2, forms a support for holding the fin while the wings 72 are being closed.

The shuttle die 200 is mounted on a reciprocating block 204 which is slidable on the lower die section 10. The block 204 is provided with cam surfaces 206 and 208 which are cooperable with a cam 210 carried by and depending from the upper die section 12. Upon reference to Fig. 6 it will be observed that upon downward movement of the cam 210 the same will engage the cam surface 206 and thereby shift the block 204 and the die 200 to the position shown in Fig. 2.

The block 204 is provided with a series of upstanding pins 212 which form a vertical guide for a die member 214 which cooperates with the die 200 to flatten the wings 72 when the die member 214 closes with respect to the die 200. As shown in Fig. 6, the die member 214 is held in its elevated position with respect to the die 200 by a lever 216, one end of the lever being pivoted at 220 to a lug 222 on the top of the die member 214, the lever being pivoted at 224 to a lug on the block 204. A spring 226 connected at one end to one end of the lever 216 and at its other end to a pin 228 on the block 204 reacts through the lever 216 to bias the die member 214 to its elevated position. However, when the upper die section 12 moves downwardly, the block 204 will shift to the left toward the position shown in Fig. 2 and a projection 230 depending from the upper die section 12 will engage the top of the die member 214 and move the same downwardly to seat on the die 200 and at the same time flatten the wings 72.

The die member 214, like the die 200, is provided with slots 232 for accommodating the tubing runs 28 when the press is in its closed position as shown in Fig. 2. Thus the die members 200 and 214 flatten the wings and thereby secure the fin to the tubing.

Upon upward movement of the die section 12 the cam 210 will engage the cam surface 208 and shift the block 204 to the right, thereby shifting the die member 200 out from beneath the fin, and as soon as the projection 230 moves away from the upper die member 214, the spring 226 will elevate the latter. As soon as the die members 200 and 214 are moved to the side of the fins as shown in Fig. 6, the indexing mechanism will adjust the frame 24 downwardly, thereby positioning the tubing runs 28 for receiving the succeeding fin.

In Fig. 7 there is disclosed the arrangement of the die means 22 for forming the notches 68. This comprises the punch 168 carried by the upper die section 12 and the hole 169 in the lower die 10. The punch 168 is carried by springs 300 which are in turn carried by the upper die section 12. The punch 168 is maintained in its position as illustrated relative to the upper die section by a slide 302 which is provided with cam surfaces 304 cooperable with cam surfaces 306 on the head of the punch 168. As shown in Fig. 7, the bosses 310 are seated on the bosses 312 on the head of the punch 168, and the slide 302 is held in this position by the rod 314 connected to the core of solenoid 316, the rod 314 being shown in the energized position of the solenoid. The solenoid circuit is correlated with the opening and closing of the press so that the circuit is kept closed for a predetermined number of operations so as to form notches 68 in a predetermined number of fins.

For example, the switch which controls the solenoid circuit may be associated with the frame 24 which holds the bank 26 of tubing so as to energize the solenoid when the frame reaches a predetermined position, and to maintain the solenoid energized for a predetermined number of operations of the press, and to open the solenoid circuit thereafter. However, any automatic method of energizing the solenoid for a predetermined number of press operations may be employed.

When the solenoid is de-energized the spring 318 shifts the slide to the left and thereby unlocks the punch 168, permitting the springs 300 to retract the punch 168 so that it will not thereafter be effective during the operation of the press, and the bosses 310 will then be positioned between the bosses 312. The cams 304 and 306 project the punch 168 to its operative position when the solenoid is energized.

After the bank of tubing 26 has the requisite number of fins thereon, the press is automatically stopped and a new bank of tubing is positioned in the frame 24, and the frame is then shifted to its upper position so that the tubing is in position to receive the first fin thereon.

While we have illustrated and described a preferred embodiment of our invention, it is understood that this is capable of modification and we therefore do not wish to be limited to the precise details set forth, but desire to avail ourselves of such changes and alterations as fall within the purview of the following claims.

We claim:

1. Apparatus for making fins and assembling such fins on tubing, comprising cooperating die sections mounted for relative movement between open and closed position and arranged for receiving a sheet of fin stock therebetween, feeding means for advancing said sheet of fin stock relative to said die sections, said die sections including die means operable for punching transversely extending rows of holes and transversely extending rows of transverse slots in said fin stock, die means operable to form slits in said fin stock between said slots and holes with each slit severing the fin stock between a slot and a hole to form wings, die means operable for deflecting said wings out of the plane of the fin stock so as to form tube entering slots in said fin stock, tube holding means for holding a bank of tubing in the path of said fin stock with the tubing runs disposed normal to the plane of the fin stock and with the tubing runs in line with said tube entering slots whereby the leading edge of the fin stock is projected onto the tubing with the tubing in the leading row of tube holes, die means for bending said wings back into the plane of said fin stock to close said tube entering slots with the tubing in said tube holes, die means for severing the fin stock transversely thereof to form an individual fin positioned on said tubing, and a notching die means operable for removing sections of the fin stock along one edge thereof, the sections removed from said fin stock by said notching die means forming cut-out portions in the individual fins formed by said apparatus, all of said die means being carried by said die sections and operable by movement of said die sections to closed position.

2. Apparatus according to claim 1 wherein said notching die means is movably mounted on one of said die sections for movement between a position in which it is operable upon said fin stock as aforesaid and a position in which it is inoperable upon said fin stock, and means for moving said notching die means relative to said one die section between said operable and inoperable positions.

3. Apparatus for making fins and assembling such fins on tubing, comprising cooperating die sections mounted for relative movement between open and closed position and arranged for receiving a sheet of fin stock therebetween, feeding means for advancing said sheet of fin stock relative to said die sections, said die sections including die means operable for punching transversely extending rows of holes and transversely extending rows of transverse slots in said fin stock, die means operable to form slits in said fin stock between said slots and holes with each slit severing the fin stock between a slot and a hole to form wings, and die means operable for deflecting said wings out of the plane of the fin stock so as to form tube entering slots in said fin stock, tube holding means for holding a bank of tubing in the path of said fin stock with the tubing runs disposed normal to the plane of the fin stock and with the tubing runs in line with said tube entering slots whereby the leading edge of the fin stock is projected onto the tubing with the tubing in the leading row of tube holes, said die sections also including die means operable for bending said wings back into the plane of said fin stock to close said tube entering slots with the tubing in said tube holes and die means for severing the fin stock to form individual fins positioned on said tubing, notching die means including a notching die member movably mounted on one of said die sections and operable in one position thereof for removing sections of the fin stock along one edge thereof, the sections removed from said fin stock by said notching die member forming cut-out portions in the individual fins formed by said apparatus, all of said die means being carried by said die sections and operable by movement of said die sections to closed position, and means for moving said notching die member relative to said one die section to a position in which it is inoperable upon said fin stock.

4. Apparatus for making fins and assembling such fins on tubing, comprising cooperating die sections mounted for relative movement between open and closed position and arranged for receiving a sheet of fin stock therebetween, feeding means for advancing said sheet of fin stock relative to said die sections, a series of die means carried by said die sections and operable by movement of said die sections to closed position, said series of die means including die means operable for punching transversely extending rows of holes and transversely extending rows of transverse slots in said fin stock, die means operable to form slits in said fin stock between said slots and holes with each slit severing the fin stock between a slot and a hole to form wings, and die means operable for deflecting said wings out of the plane of the fin stock so as to form tube entering slots in said fin stock, tube holding means for holding a bank of tubing in the path of said fin stock with the tubing runs disposed normal to the plane of the fin stock and with the tubing runs in line with said tube entering slots whereby the leading edge of the fin stock is projected onto the tubing with the tubing in the leading row of tube holes, said series of die means including die means for bending the leading row of wings back into the plane of said fin stock to close said tube entering slots with the tubing in said leading row of tube holes, and die means for severing the fin stock to form an individual fin positioned on said tubing, said die means for bending said wings back into the plane of said fin stock comprising a shuttle die member actuated for transverse reciprocating movement by relative movement of said die sections and including a die member movable to a position beneath the individual fin to be formed and a cooperating relatively movable die member engageable with the wings of such fin, said series of die means also including a notching die member carried by one of said die sections and operable for removing sections of the fin stock along one edge thereof, the sections removed from said fin stock by said notching die member forming cut-out portions in the individual fins formed by said apparatus.

References Cited in the file of this patent

UNITED STATES PATENTS

| | | |
|---|---|---|
| 1,588,174 | Dewald | June 8, 1926 |
| 1,742,321 | Rodgers | Jan. 7, 1930 |
| 2,170,774 | Fagan | Aug. 22, 1939 |
| 2,181,108 | Przyborowski | Nov. 21, 1939 |
| 2,224,549 | O'Brien | Dec. 10, 1940 |
| 2,224,550 | O'Brien | Dec. 10, 1940 |
| 2,486,941 | Graf | Nov. 1, 1949 |
| 2,558,952 | Hayward | July 3, 1951 |